S. G. ELLIOTT.
Photometer.
No. 55,797.
Patented June 19, 1866.
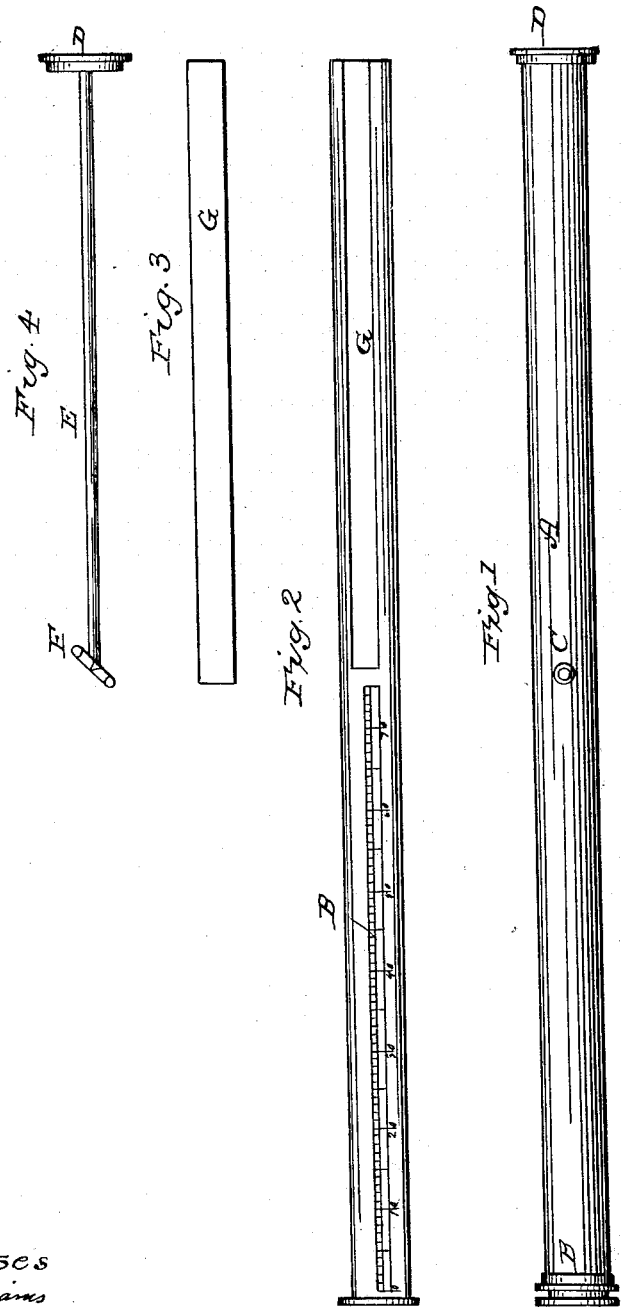

UNITED STATES PATENT OFFICE.

S. G. ELLIOTT, OF SAN FRANCISCO, CALIFORNIA.

IMPROVEMENT IN PHOTOMETERS.

Specification forming part of Letters Patent No. 55,797, dated June 19, 1866.

*To all whom it may concern:*

Be it known that I, S. G. ELLIOTT, of San Francisco, in the State of California, have invented an instrument entitled "Elliott's Photometer;" and I do hereby declare that the following is a full, clear, and exact description of its construction and operation, reference being had to the accompanying drawings, and the letters of reference marked thereon, making a part of this specifiation, in which—

Figure 1 is the photometer. Fig. 2 is an inner tube, which is to slide out and in in such a manner as to expose any part of the strip of glass G, Fig. 2, to the light admitted through the aperture C in the tube A, Fig. 1, the scale, from one to seventy, indicating the part so exposed; Fig. 3, letter G, a glass plate prepared so that one end is opaque and graduated, so as to have the other end transparent; Fig. 4, (letters D, E, and F,) D is the bottom end of tube A, Fig. 1; E, a rod supporting reflector F, which receives the light that passes through the aperture C, Fig. 1, and turns the same at a right angle to an aperture for the eye in the top end of the tube B, Fig. 2.

The nature of my invention is designed as a measure of the penetrating power of different degrees of light.

To enable others skilled in the art to make and use my invention, I will now proceed to describe its construction and operation.

I construct the tube A of any suitable material, with an aperture in the center, one end open for the admission of tube B, Fig. 2, which has a graduated scale marked upon one end from one to seventy. In the opposite end I insert the strip of glass G, which is prepared with collodion in the same manner as plates are prepared for taking pictures by the photographic process, and is exposed to the light so as to produce a graduation of shade from opaqueness to transparency. The glass plate is placed in a box made with an open end, and with the end forms a right-angled triangle, the top of the box presenting an inclined plane and joining the bottom, so as to form the hypotenuse of the triangle. The plate is then fixed in the same manner that negative plates are prepared for printing the common photographs, and then cut into strips of the proper width and inserted, as shown in Fig. 2.

Fig. 4 is a reflector, made by cutting from common looking-glass square pieces of the width of one-half inch, which are secured to the rod E, Fig. 4, by a thin piece of brass plate soldered to the end of the rod, so as to stand at an angle of forty-five degrees to the line of the rod, as seen in Fig. 4. This reflector is inserted in the tube A, Fig. 1, and secured by being soldered to the bottom end of the tubes, so that the reflector F stands opposite the aperture C.

To use the instrument for the purpose of measuring the degree of light, present the aperture C, Fig. 1, to the light to be measured, with eye at the opening at the top end of the instrument, and draw out the inner tube until the eye can trace a faint shadow of the circular form of the aperture C on the reflector F, and note the number of degrees indicated on the inner tube, Fig. 2. The degrees thus shown give the strength of the light measured.

What I claim as my invention, and desire to secure by Letters Patent, is—

The combination of the tube A with the sliding graduating-tube B, reflector F, and rod E, when said tubes, reflector, and rod are constructed in the manner and for the purpose as substantially described.

S. G. ELLIOTT.

Witnesses:
   JOHN D. BLOOR,
   JOHN S. HOLLINGSHEAD.